United States Patent
Rennie et al.

(10) Patent No.: US 12,433,913 B2
(45) Date of Patent: Oct. 7, 2025

(54) TREATMENT OF ACUTE RESPIRATORY DISEASE SYNDROME (ARDS) WITH POLYSULFATED POLYSACCHARIDES

(71) Applicant: Paradigm Biopharmaceuticals Ltd., Melbourne (AU)

(72) Inventors: Paul Rennie, Melbourne (AU); Ravi Krishnan, Melbourne (AU)

(73) Assignee: Paradigm Biopharmaceuticals Ltd., Melbourne (AU)

( * ) Notice: Subject to any disclaimer, the term of this patent is extended or adjusted under 35 U.S.C. 154(b) by 554 days.

(21) Appl. No.: 17/917,904

(22) PCT Filed: Apr. 9, 2021

(86) PCT No.: PCT/AU2021/050327
§ 371 (c)(1),
(2) Date: Oct. 7, 2022

(87) PCT Pub. No.: WO2021/203174
PCT Pub. Date: Oct. 14, 2021

(65) Prior Publication Data
US 2023/0136817 A1    May 4, 2023

(30) Foreign Application Priority Data
Apr. 9, 2020    (AU) ................ 2020901139

(51) Int. Cl.
*A61K 31/737* (2006.01)
*A61P 11/00* (2006.01)
*A61P 31/14* (2006.01)

(52) U.S. Cl.
CPC ............ *A61K 31/737* (2013.01); *A61P 11/00* (2018.01); *A61P 31/14* (2018.01)

(58) Field of Classification Search
None
See application file for complete search history.

(56) References Cited

U.S. PATENT DOCUMENTS 5,514,667 A    5/1996 Cullis-Hill

FOREIGN PATENT DOCUMENTS

| AU | 9179470 | 1/1992 |
|---|---|---|
| WO | 2004014400 | 2/2004 |
| WO | 2006003521 | 1/2006 |
| WO | 2008144836 | 12/2008 |

OTHER PUBLICATIONS

Sanden et al., Broad Th2 neutralization and anti-inflammatory action of pentosan polysulfate sodium in experimental allergic rhinitis, Immunity Inflammation and Disease, 2017, vol. 5 No 3, pp. 300-309.

Herrero et al., Pentosan Polysulfate a Novel Glycosaminoglycan Like Molecule for Effective Treatment of Alphavirus-Induced Cartilage Destruction and Inflammatory Disease, Journal of Virology, 2015, vol. 89 No 15, 14 pages.

Huang et al., Clinical features of patients infected with 2019 novel coronavirus in Wuhan, China, The Lancet, 2020, vol. 395, 10 pages.

*Primary Examiner* — Layla D Berry
(74) *Attorney, Agent, or Firm* — Thorpe North & Western, LLP

(57) ABSTRACT

Methods for the treatment of Acute Respiratory Distress Syndrome (ARDS), particularly ARDS caused by viral infections such as influenza and SARS-CoV-2, comprising the administration of pentosan polysulfate (PPS) are provided. Some provided methods comprise the administration of sodium pentosan polysulfate. Prophylactic methods comprising the administration (for example, intra-nasally) of sodium pentosan polysulfate to inactivate a vims which is causative of ARDS are also provided.

14 Claims, 9 Drawing Sheets

Experiment A

Experiment B

A

B

A

B

A

B

TREATMENT OF ACUTE RESPIRATORY DISEASE SYNDROME (ARDS) WITH POLYSULFATED POLYSACCHARIDES

CROSS-REFERENCE TO RELATED APPLICATIONS

The present application claims priority from Australian Provisional Patent Application No 2020901139 filed on 9 Apr. 2020, the contents of which are incorporated herein by reference in their entirety.

TECHNICAL FIELD

This disclosure relates to the medical use of polysulfated polysaccharides and compositions thereof for the treatment of respiratory disease. In particular, the disclosure relates to use of pentosan polysulfate in the treatment of acute respiratory disease syndrome (ARDS). More particularly, the disclosure relates to use of pentosan polysulfate in the treatment of ARDS induced by coronaviruses, such as SARS-CoV-2.

Throughout this disclosure, various publications are referred to by number. Full citations for these publications, in the order they appear in the application, are presented in a References section immediately before the claims. The disclosures of these referenced publications are incorporated herein in their entirety.

BACKGROUND

Respiratory disease epidemics have affected human populations throughout the globe in recent history. Severe Acute Respiratory Syndrome (SARS) emerged in China in 2002 and caused 8000 cases with a 10% mortality rate. Middle Eastern Respiratory Syndrome (MERS) MERS emerged in 2012 and caused 1700 cases with almost 40% mortality. Coronaviruses were identified as the infectious agents responsible for the SARS and MERS epidemics. These viruses are genetically diverse and have the ability to jump in and out of human and new zoonotic hosts making them a challenge to counteract [1].

In December 2019, there was an outbreak of acute respiratory disease in Wuhan city, Hubei province, China with patients suffering from unexplainable pneumonia. By 7 Jan. 2020 it was confirmed that this new acute respiratory disease was caused by a novel coronavirus, SARS-CoV-2 [2]. Cases of the new disease, COVID-19, quickly swept across China and around the world aided by international travel [3]. The World Health Organisation (WHO) declared the disease as a pandemic 11 Mar. 2020 and as of 4 April, there have been 1,051,635 cases with a mortality rate of 5.7% [4].

Patients infected with SARS-CoV-2 may be asymptomatic. However, patients with symptoms may experience fever, dry cough and shortness of breath resulting from infection in the upper respiratory tract. Patients may also display flu-like symptoms. Where the infection is more severe and spread deeply into the lungs more serious illness and difficulty in breathing may develop. Secondary infection and/or non-pulmonary conditions (heart, renal complications) may also develop. Serious illness typically features pneumonia leading to ARDS, which is one of the major causes of deaths from COVID-19 [2, 5].

There is no established treatment option for ARDS caused by SARS-CoV-2. Instead, supporting care and non-specific treatment protocols have been used to ameliorate patient's symptoms [6]. In this regard, lung ventilator strategies either alone or in combination with the administration of, for example, broad spectrum antiviral or antibacterial agents or convalescent plasma remain the mainstay of available options in the absence of effective pharmaceutical therapy. However, there is a shortage of ventilation systems available to accommodate the large surge of patients critically ill with ARDS caused by SARS-CoV-2 [7].

Further, candidates for pharmaceutical therapy of ARDS may lack the safety and the activity required. For example, some steroids should not be generally used as they are known to decrease the immune response and may increase viral shedding. Attempts to treat patients in the prior SARS or MERS epidemics with steroids were not effective as were attempts with approved antivirals (ribavirin, lopinavir-ritonavir) and immunomodulators [8]. Side effects can be observed with the above agents. For example anemia in the case of ribavirin [6].

Thus, there is a clear need for pharmaceutical agents that may be used in the treatment of ARDS caused by SARS-Cov-2.

SUMMARY

Pentosan polysulfate is a member of the polysulfated polysaccharides class of compounds, including heparin, chitosan polysulfate, the fucans, that have been used for a number of years as anticoagulants [9-14] and safely. Pentosan polysulfate (PPS) is a weaker anticoagulant than heparin [9, 12, 13] itself has been used post-surgically and prophylactically as a thrombolytic agent [14], and PPS is the active agent in the drug ELMIRON® which is currently prescribed for interstitial cystitis. The use of PPS in the treatment of bone related pathologies and associated conditions has been described [15, 16]. The use of PPS in the treatment of inflammatory conditions such as asthma, allergic rhinitis, and/or chronic obstructive pulmonary disease (COPD) [17] has also been investigated.

In work leading to the present disclosure it has been observed that PPS can exert a number of biological effects which may act in concert for the effective treatment of ARDS. In this regard, PPS can target several aspects that are consistently and prominently found in ARDS pathogenesis, not just one aspect.

The pathogenesis of ARDS caused by SARS-CoV-2 involves a cascade of events and multiple factors. SARS-CoV-2 enters lung cells by way of its spike protein binding with angiotensin-converting enzyme 2 (ACE 2) receptor. Endothelial and epithelial lung cell injury by infection results in accumulation of pulmonary edema. Lung edema, endothelial and epithelial injury are accompanied by an influx of neutrophils into the interstitium and broncheoalveolar space. Activation and recruitment of neutrophils are regarded to play a key role in progression of ARDS. In this regard, neutrophils are the first cells to be recruited to the site of inflammation. Decreases in epithelial cell barrier function facilitate influx of protein rich fluid and other macromolecules into alveolar space. ARDS pathogenesis is also characterised by impairment of mechanisms that remove pulmonary edema fluid and inflammatory cells from the lung.

Consistent and prominent findings in ARDS are deposition of fibrin, complement mediated lung injury, cytokine response, inflammation and neutrophil infiltration.

Pentosan polysulfate has the potential to target these aspects.

Deposition of fibrin. Moore et al. 2020 provide reason to use fibrinolytic agents to treat ARDS caused by SARS-CoV-2 [7]. PPS has effects on the fibrinolytic system [18].

Complement mediated lung injury. PPS prevents complement mediated tissue injury [19].

Cytokine response. In the animal model of alpha viral infection (alphavirus induced arthralgia), PPS showed reduction in IL-1a; IL-2, IL-6, MIP1a and CCL2 within 3 to 10 days post PPS treatment in infected animals [20].

Inflammation. In addition to its anti-inflammatory actions mediated via NF-kappa B inhibition, PPS inhibits cell movement induced by three key chemokines IL-8, MCP-1 and MIP-1a known to play a role in the inflammations associated with COPD [21].

Neutrophil infiltration. PPS is observed to have an effect on P-selectin [22]. Upregulation of P-selectin in ARDS causes neutrophil infiltration into lungs.

Further, in regard to the pathogenesis of ARDS, PPS is an antagonist of human leukocyte elastase (also called human neutrophil elastase) and therefore can inhibit lung tissue damage mediated by neutrophils [22A]. Further, it has been shown that levels of neutrophil elastase are increased in ARDS [22B]. In an allergen induced GP model of asthma intra-tracheal PPS: a) significantly reduced the total number of infiltrating leukocytes and neutrophils in the bronchoalveolar fluid; b) significantly reduced the total protein content in the bronchoalveolar fluid; c) inhibited airway hyper-reactivity d) increased lung compliance. PPS has also be shown to inhibit metalloproteinases [21] and ADAMTS5 (versicanase) in lung [22C].

It is the multifaceted activity potentially possessed by PPS that marks its ability to act as a versatile and an effective option in the treatment of acute respiratory diseases. For example, whilst fibrin deposits are indisputably a prominent finding in ARDS, the proposed activation of fibrinolysis with drugs like tPA, urokinase or streptokinase [7] is thought to specific. It will address only one aspect in the cascade of events leading to ARDS. Without multifaceted activity, it is proposed that candidate agents will have relatively less ability to combat the diverse pathologies exhibited by ARDS and, as such, will be relatively more limited in the treatment of ARDS than PPS. Moreover, PPS is safe.

Thus, the present disclosure contemplates the use of PPS in the treatment of respiratory diseases including ARDS, particularly ARDS caused by a coronavirus, such as SARS-CoV-2. In this regard, the present disclosure proposes the use of PPS as a monotherapy or as an adjunctive treatment option for ARDS, particularly ARDS caused by a coronavirus, such as SARS-CoV-2.

It has been observed that many patients with ARDS survive, but then suffer from lung fibrosis caused by the very mechanical ventilation that was required for their support. The lung fibrosis may significantly contribute to morbidity and mortality in patients [22D]. Thus, the present disclosure also proposes the use of PPS for therapeutic intervention in a condition that occurs consequent to the immediate onset of ARDS, such as lung fibrosis.

According to a one aspect, there is provided a method for the treatment of Acute Respiratory Distress Syndrome (ARDS) in a subject, the method comprising the step of administering pentosan polysulfate (PPS) or an acceptable salt thereof, to a subject in need of such treatment.

According to an another aspect, there is provided a composition comprising a pentosan polysulfate (PPS) or an acceptable salt thereof, and an acceptable excipient for the treatment of Acute Respiratory Distress Syndrome (ARDS).

According to another aspect, there is provided a composition comprising a pentosan polysulfate (PPS) or an acceptable salt thereof, and an acceptable excipient for use in the treatment of Acute Respiratory Distress Syndrome (ARDS).

According to another aspect, there is provided use of a pentosan polysulfate (PPS) or an acceptable salt thereof, in the treatment of Acute Respiratory Disease Syndrome (ARDS).

According to another aspect, there is provided use of a pentosan polysulfate (PPS) or an acceptable salt thereof, in the manufacture of a medicament for the treatment of Acute Respiratory Distress Syndrome (ARDS).

Definitions

Unless otherwise defined herein, scientific and technical terms used in connection with the present application shall have the meanings that are commonly understood by those of ordinary skill in the art. Further, unless otherwise required by context, singular terms shall include pluralities and plural terms shall include the singular. Thus, as used in this specification and the appended claims, the singular forms "a", "an" and "the" include plural referents unless the context clearly indicates otherwise. For example, reference to "a cell" includes populations of a plurality of cells.

With regards to the definitions provided herein, unless stated otherwise, or implicit from context, the defined terms and phrases include the provided meanings. Unless explicitly stated otherwise, or apparent from context, the terms and phrases below do not exclude the meaning that the term or phrase has acquired by a person skilled in the relevant art. The definitions are provided to aid in describing particular embodiments, and are not intended to limit the claimed invention, because the scope of the invention is limited only by the claims.

Throughout the present specification, various aspects and components of the invention can be presented in a range format. The range format is included for convenience and should not be interpreted as an inflexible limitation on the scope of the invention. Accordingly, the description of a range should be considered to have specifically disclosed all the possible sub-ranges as well as individual numerical values within that range, unless specifically indicated. For example, description of a range such as from 1 to 5 should be considered to have specifically disclosed sub-ranges such as from 1 to 2, from 1 to 3, from 1 to 4, from 2 to 3, from 2 to 4, from 2 to 5, from 3 to 4 etc., as well as individual and partial numbers within the recited range, for example, 1, 2, 3, 4, and 5. This applies regardless of the breadth of the disclosed range. Where specific values are required, these will be indicated in the specification.

As used herein, the term "about" refers to a range of ±10% of the specified value or a range associated with the experimental error known to the skilled addressee in measuring the specified value, whichever is the greater.

The term "acceptable excipient" includes excipients or agents such as solvents, diluents, dispersion media, coatings, antibacterial and antifungal agents, isotonic and absorption delaying agents and the like that are physiologically compatible and are not deleterious to a compound as described herein or use thereof. The use of such carriers and agents to prepare compositions of pharmaceutically active substances is well known in the art [23].

The term "acceptable salts" include, but are not limited to, inorganic acid salts such as hydrochloride, hydrobromide, sulfate, phosphate and the like; organic acid salts such as formate, acetate, trifluoroacetate, maleate, tartrate and the like; sulfonates such as methanesulfonate, benzenesulfonate, p-toluenesulfonate and the like; amino acid salts such as arginate, asparaginate, glutamate and the like; metal salts such as sodium salt, potassium salt, cesium salt and the like;

alkaline earth metals such as calcium salt, magnesium salt and the like; and organic amine salts such as triethylamine salt, pyridine salt, picoline salt, ethanolamine salt, triethanolamine salt, discyclohexylamine salt, N,N'-dibenzylethylenediamine salt and the like.

Base salts include, but are not limited to, those formed with pharmaceutically acceptable cations, such as sodium, potassium, lithium, calcium, magnesium, zinc, ammonium, alkylammonium such as salts formed from triethylamine, alkoxyammonium such as those formed with ethanolamine and salts formed from ethylenediamine, choline or amino acids such as arginine, lysine or histidine. General information on types of acceptable salts and their formation is known to those skilled in the art and is as described in general texts [24].

The terms "administration of" and or "administering a" compound should be understood to mean providing a compound of the invention to the individual in need of treatment.

The term "composition" as used herein is intended to encompass a product comprising the specified ingredients in the specified amounts, as well as any product which results, directly or indirectly, from combination of the specified ingredients in the specified amounts.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

This disclosure is directed to treatment of animal subjects. The treatment of an "animal subject" may also be referred to the treatment of a "patient" or an "individual". An animal subject has presented a clinical manifestation of a particular symptom or symptoms suggesting the need for treatment, is treated for a condition, or who has been diagnosed with a condition to be treated or who is suspected of having a condition to be treated.

Thus, the present disclosure broadly contemplates the treatment of animal subject infected with coronaviruses. Coronaviruses belong to the family Coronaviridae is comprised of two subfamilies. The subfamily Coronavirinae, contains a substantial number of pathogens of mammals and birds. The subfamily, Torovirinae, contains pathogens of both terrestrial and aquatic animals, such as fish. Thus, the present disclosure contemplates a range of animal subjects [25].

In one example, the animal subject is a mammal. The disclosure is to be understood to be applicable to human and non-human mammals. Thus, in one example the mammal is human. The human can be male or female. Alpha- and betacoronaviruses infect only mammals usually causing respiratory symptoms in humans and gastroenteritis in other animals. Gamma- and deltacoronaviruses typically infect birds, but some may infect mammals.

Non-human mammals include, but not limited to a primate, livestock and farm animals (e.g. sheep, horses, cattle, pigs), domestic pets, such as cats and dogs, performance animal (e.g. racehorses, greyhounds), laboratory test animal (e.g. mice, rabbits, rats, guinea pigs) as well as those mammals that usually exist in the wild but may be susceptible to treatment by virtue of such mammals being situated in zoos, wildlife parks and the like. The present disclosure also contemplates non-human mammal subjects that that have been identified as zoonotic hosts of coronaviruses. Such hosts include, but are not limited to, bats, camels, civets. For example, MERS-CoV was found to be transmitted from bats to camels to humans.

The term "animal subject" as used herein may also refer to animals that are not mammals. Examples include aquatic animals and birds. The term "aquatic animal(s)" as used herein includes fish including but not limited to finfish and shellfish. Shellfish include but not limited to a crustacean (e.g. crabs, crayfish, lobsters, prawns and shrimp) and a mollusc (e.g. clams, mussels, oysters, scallops and winkles). Birds include, for example, poultry such as chickens, ducks, geese, turkeys, quail, guinea fowl, pigeons (including squabs) and birds of prey (including hawks, eagles, kites, falcons, vultures, harriers, ospreys, and owls). Chickens include, for example, broiler chickens (broilers), chicks, roosters and layer hens (layers). Gamma- and delta coronaviruses typically infect birds.

As used herein, the terms "treating", "treat" or "treatment" and variations thereof, refer to clinical intervention designed to alter the natural course of the subject during the course of clinical pathology. Desirable effects of treatment include decreasing the rate of disease progression, ameliorating or palliating the disease state, and remission or improved prognosis. A subject is successfully "treated", for example, if one or more of the above treatment outcomes is achieved. As used herein, the terms "treating", "treat" or "treatment" and variations thereof encompass "preventing", "prevent" or "prevention" which would be understood to refer to clinical intervention designed to avert the development of a course of clinical pathology.

An "effective amount" encompasses a "therapeutically effective" amount which refers to at least the minimum concentration or amount required to effect a measurable improvement of a particular disease (e.g., bone marrow edema). An effective amount herein may vary according to factors such as the disease state, age, sex, and weight of the patient, and the ability of the PPS to elicit a desired response in the individual. An effective amount is also one in which any toxic or detrimental effects of the PPS are outweighed by the therapeutically beneficial effects. An "effective amount" also encompasses a "prophylactically effective" amount which refers to the amount of drug or the rate of drug administration needed to produce the desired preventive result.

The present disclosure refers to polysulfated polysaccharides. Polysulfated polysaccharides are, for example, selected from the group consisting of high molecular weight heparin, low molecular weight heparins, the heparan sulfates, pentosan polysulfate, chondroitin polysulfate, chitosan polysulfate, dermatan polysulfate sulodexide, dextran sulfate, polysulfated inulin, sulfated lactobionic acid amide, sulfated bis-aldonic acid amide, sucrose octasulfate, fucoidan-1, fucoidan-2, sulfated beta-cyclodextrin, sulfated gamma-cyclodextrin and small sulfated compounds. A non-limiting example of a small sulfated compound is inositol hexasulfate. In one example, the polysulfated polysaccharide is selected from the group consisting of high molecular weight heparin, low molecular weight heparins, pentosan polysulfate (PPS), chondroitin polysulfate and chitosan polysulfate. In a preferred example, the polysulfated polysaccharide is pentosan polysulfate. In particular, sodium pentosan polysulfated.

BRIEF DESCRIPTION OF DRAWINGS

FIG. 1 is a schematic depiction of Study 1, experiment A design.

FIG. 2 is a schematic depiction of Study 1, experiment B design.

FIG. 3 are graphs showing the effect of PPS treatment on weight loss in C57/BL6 mice infected with PR8 H1N1 influenza strain in Study 1.

DESCRIPTION OF EMBODIMENTS

Figure 1:
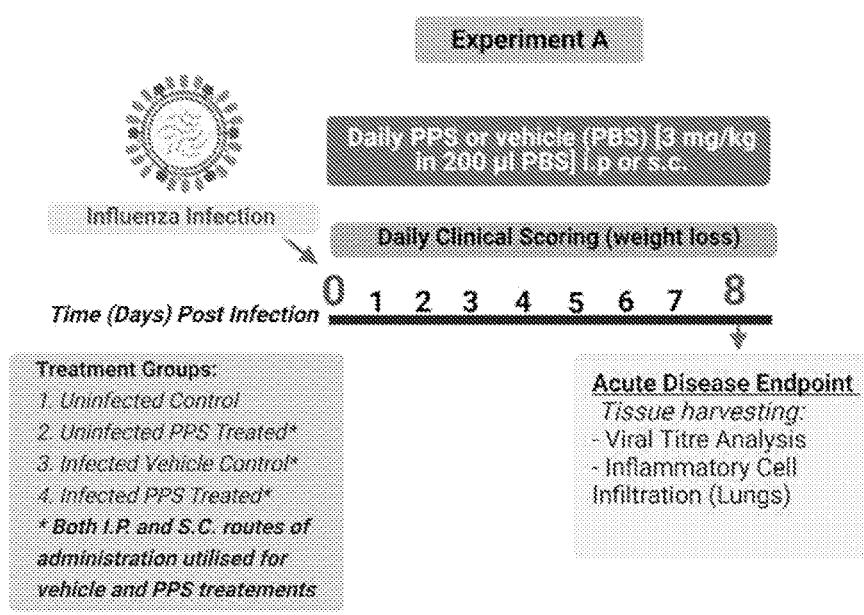
Figure 2:
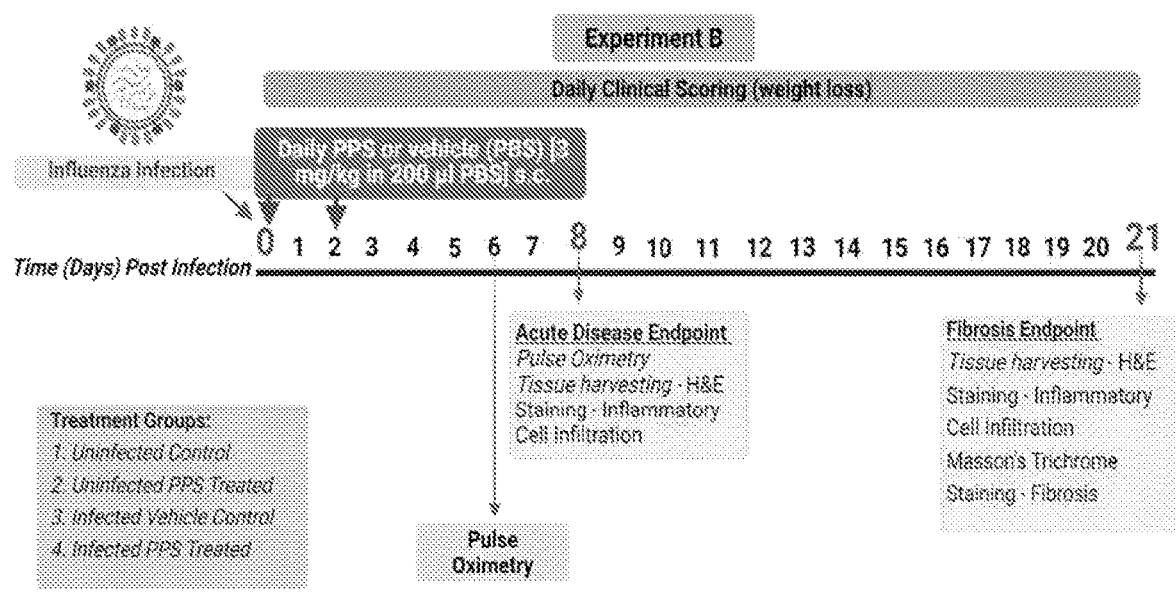
Figure 3:
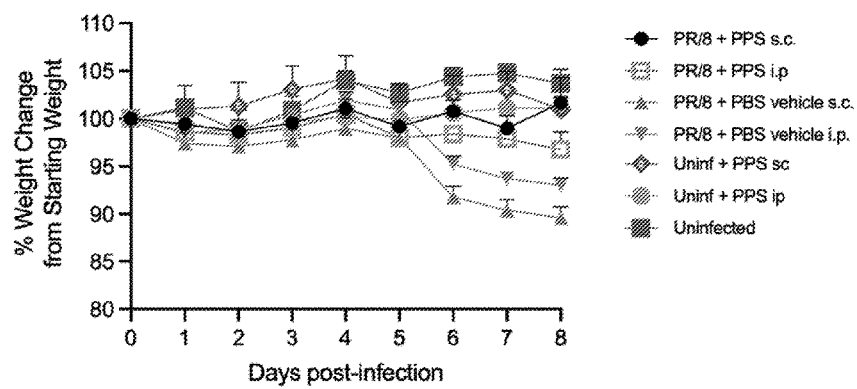
Figure 3:
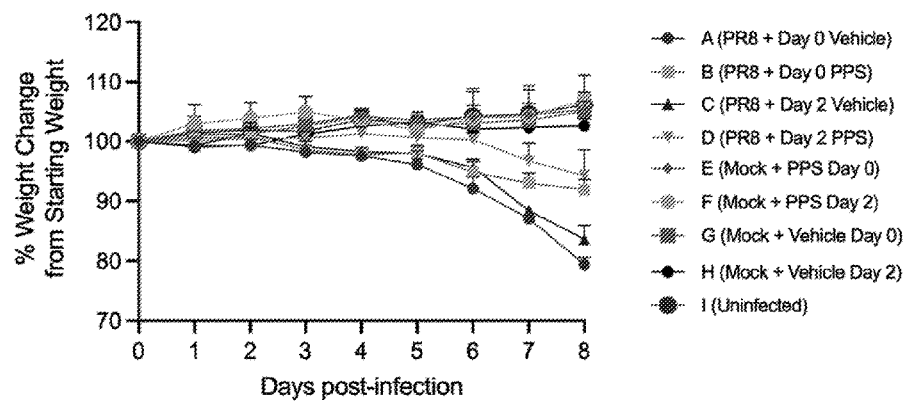
Figure 4:
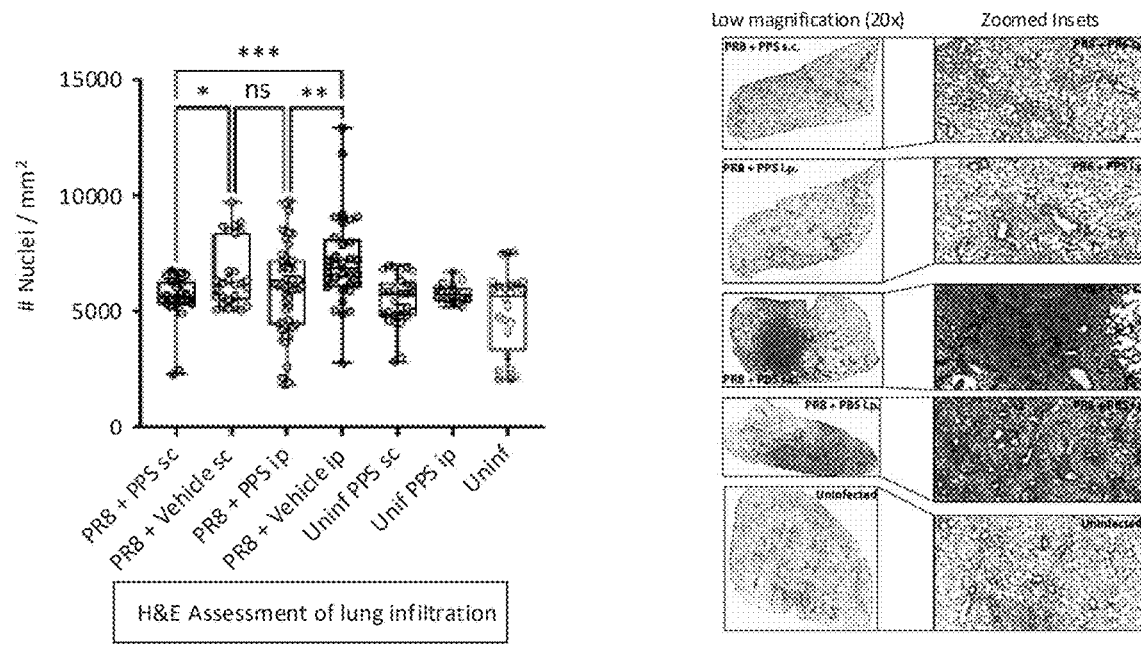
FIG. 4A is a graph (A & B) showing the effect of PPS treatment on lung infiltration in C57BL/6J mice infected with PR8 H1N1 influenza strain in Study 1.
FIG. 4B shows representative sections at low and high magnifications of lungs from animals at Day 8 showing the effect of PPS treatment on lung infiltration in C57BL/6J mice infected with PR8 H1N1 influenza strain in Study 1.
Figure 5:
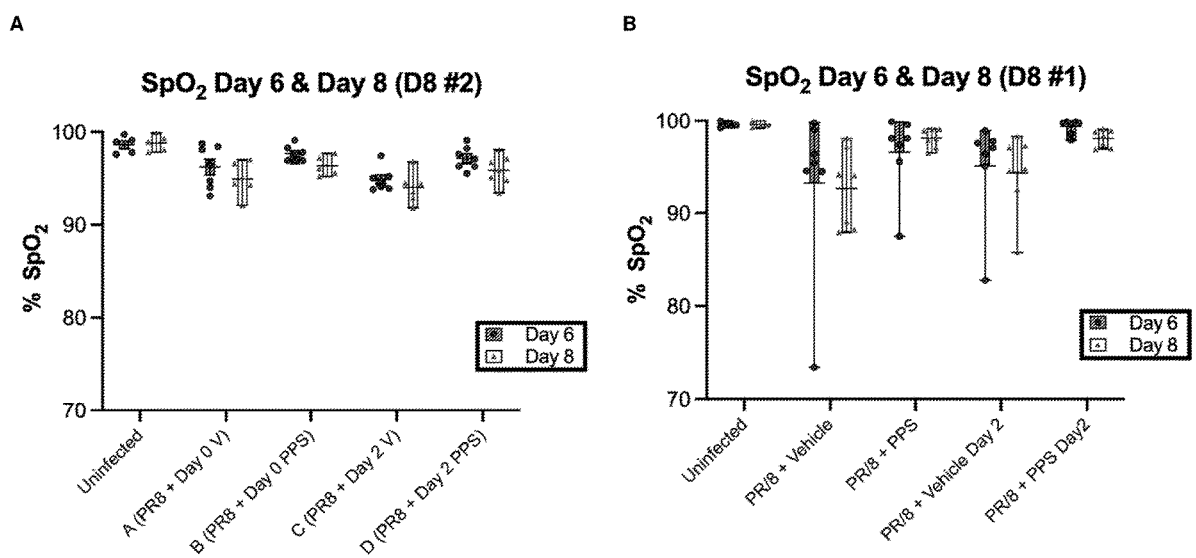
FIG. 5 are graphs (A & B) showing the Effect of PPS on lung function as determined by oxygen saturation levels.
Figure 6:
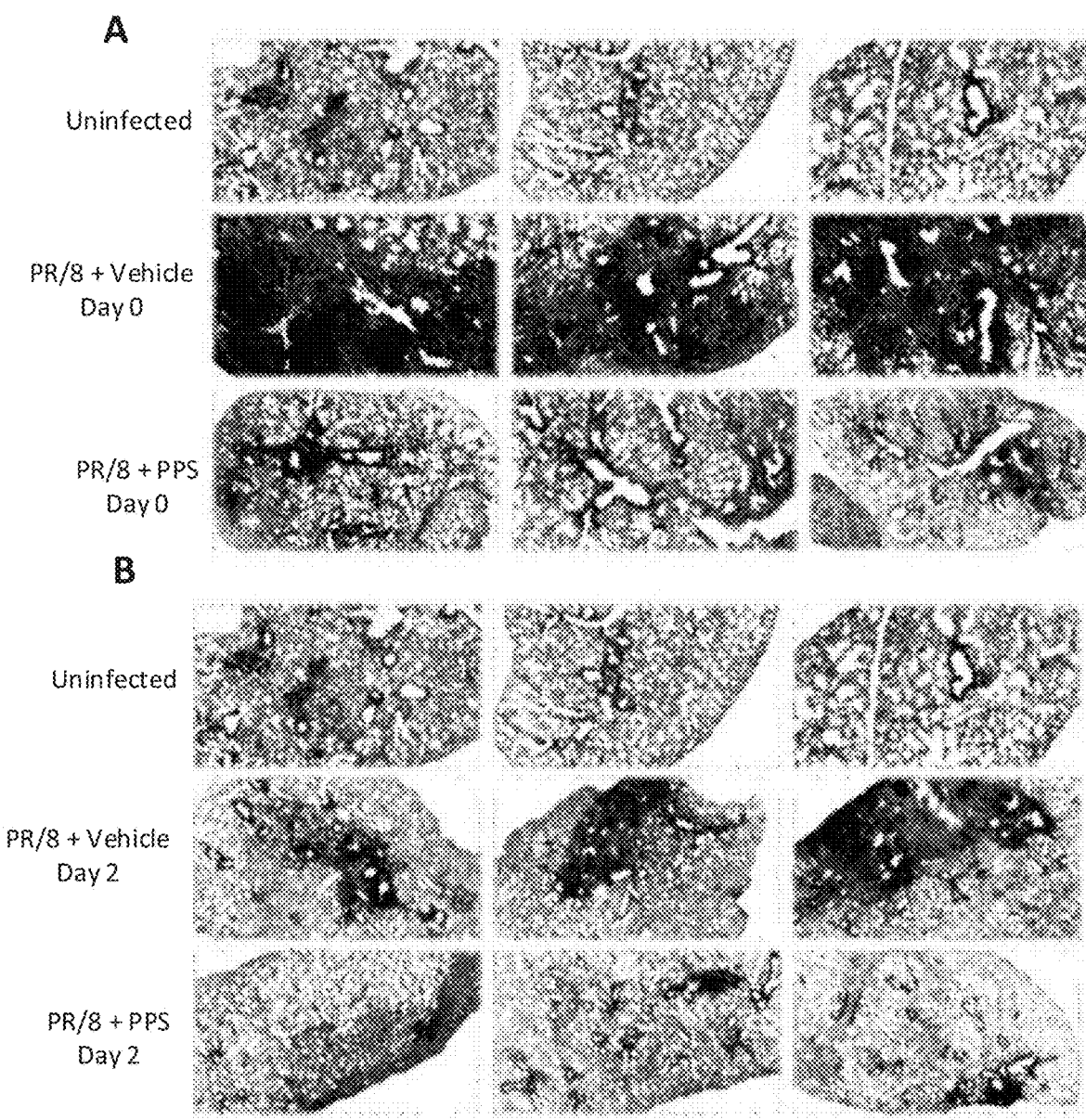
FIG. 6 shows representative sections (A & B) of lungs showing the effect of PPS treatment on pulmonary fibrosis in influenza infected animals with ARDS.

The present disclosure relates to a method for the treatment of Acute Respiratory Distress Syndrome (ARDS) in a subject, the method comprising the step of administering an effective amount of pentosan polysulfate (PPS) or an acceptable salt thereof, to a subject in need of such treatment.

In one example of the above method, ARDS is caused by a coronavirus.

In one example, the animal subject is a mammal. In one example, the mammal is human. In those examples where the animal subject is a mammal, the coronavirus may be an alpha-coronavirus, a beta-coronavirus, a gamma-coronavirus or a delta-coronavirus. In one example, the coronavirus is an alpha-coronavirus or a beta-coronavirus. In one example, the coronavirus is a beta-coronavirus.

In one example, the coronavirus is selected from the group consisting of: HKU1, OC43, Severe Acute Respiratory Syndrome coronavirus (SARS-CoV), Middle Eastern Respiratory Syndrome coronavirus (MERS-CoV); Severe Acute Respiratory Syndrome coronavirus 2 (SARS-CoV-2) and strains thereof. In one example, the coronavirus is Severe Acute Respiratory Syndrome coronavirus 2 (SARS-CoV-2) or strains thereof.

The present disclosure relates to a composition comprising a pentosan polysulfate (PPS) or an acceptable salt thereof, and an acceptable excipient for the treatment of Acute Respiratory Distress Syndrome (ARDS).

The present disclosure relates to the use of a composition comprising a pentosan polysulfate (PPS) or an acceptable salt thereof, and an acceptable excipient in the preparation of a medicament for the treatment of Acute Respiratory Distress Syndrome (ARDS).

The present disclosure also relates to a composition comprising a pentosan polysulfate (PPS) or an acceptable salt thereof, and an acceptable excipient when used in the treatment of Acute Respiratory Distress Syndrome (ARDS).

The present disclosure also relates to a composition comprising a pentosan polysulfate (PPS) or an acceptable salt thereof, and an acceptable excipient for the prevention or minimization of risk of a coronavirus infection which causes ARDS.

The present disclosure also relates to a prophylactic treatment to prevent or minimize the risk of a coronavirus infection which causes ARDS comprising administering an effective amount of a composition comprising a pentosan polysulfate (PPS) or an acceptable salt thereof and an acceptable excipient to a subject.

In one example of the above compositions, ARDS is caused by a coronavirus.

In one example, the animal subject is a mammal. In one example, the mammal is human. In those examples where the animal subject is a mammal, the coronavirus may be an alpha-coronavirus, a beta-coronavirus, a gamma-coronavirus or a delta-coronavirus. In one example, the coronavirus is an alpha-coronavirus or a beta-coronavirus. In one example, the coronavirus is a beta-coronavirus.

In one example, the coronavirus is selected from the group consisting of: HKU1, OC43, Severe Acute Respiratory Syndrome coronavirus (SARS-CoV), Middle Eastern Respiratory Syndrome coronavirus (MERS-CoV); Severe Acute Respiratory Syndrome coronavirus 2 (SARS-CoV-2) and strains thereof. In one example, the coronavirus is Severe Acute Respiratory Syndrome coronavirus 2 (SARS-CoV-2) or strains thereof.

The present disclosure also relates to use of a pentosan polysulfate (PPS) or an acceptable salt thereof, in the treatment of Acute Respiratory Disease Syndrome (ARDS).

The present disclosure also relates to use of a pentosan polysulfate (PPS) or an acceptable salt thereof, in the manufacture of a medicament for the treatment of Acute Respiratory Distress Syndrome (ARDS).

In one example of the above compositions, ARDS is caused by a coronavirus.

In one example, the animal subject is a mammal. In one example, the mammal is human. In those examples where the animal subject is a mammal, the coronavirus may be an alpha-coronavirus, a beta-coronavirus, a gamma-coronavirus or a delta-coronavirus. In one example, the coronavirus is an alpha-coronavirus or a beta-coronavirus. In one example, the coronavirus is a beta-coronavirus.

In one example, the coronavirus is selected from the group consisting of: HKU1, OC43, Severe Acute Respiratory Syndrome coronavirus (SARS-CoV), Middle Eastern Respiratory Syndrome coronavirus (MERS-CoV); Severe Acute Respiratory Syndrome coronavirus 2 (SARS-CoV-2) and strains thereof. In one example, the coronavirus is Severe Acute Respiratory Syndrome coronavirus 2 (SARS-CoV-2) or strains thereof.

With respect to any one of the methods, compositions or uses described above, the PPS is selected from the group consisting of: the sodium salt of pentosan polysulfate (NaPPS), the magnesium salt of pentosan polysulfate (MgPPS), the calcium salt of pentosan polysulfate (CaPPS), and the zinc salt of pentosan polysulfate (ZnPPS). In one example, the PPS is NaPPS.

The pentosan polysulfate (PPS) is, for example, selected from the group consisting of: the sodium salt of pentosan polysulfate (NaPPS), the magnesium salt of pentosan polysulfate (MgPPS), the calcium salt of pentosan polysulfate (CaPPS), and the zinc salt of pentosan polysulfate (ZnPPS). In one example, the pentosan polysulfate (PPS) is sodium pentosan polysulfate (NaPPS). In one preferred example, NaPPS is manufactured to the specifications lodged with the US FDA and European Community EMEA by Bene-PharmaChem GmbH & Co KG, Geretsried, Germany.

It will be recognized by persons skilled in the art, that PPS and PPS compositions suitable for administration by a variety of routes may be formulated by reference to standard textbooks in this field [23]. These compositions include by injection, oral (including tablets and capsules containing gastro-intestinal drug absorption extenders and enhancers), intravenous, respiratory and the like.

If a treatment is to be administered orally, it is preferred that PPS is co-administered with a coxib as disclosed in PCT/AU2019/050119, the contents of which are included by way of cross-reference.

The treatment may be by administering through intramuscular (M) or sub-cutaneous (SC) routes, intravenously (IV), intra-articularly (IA), peri-articularly, topically, via suppositories or orally. The treatment may also be by administering through a respiratory route. The respiratory route may be an intra-nasal route; an intra-tracheal or endo-tracheal route. The respiratory route may be a pulmonary route.

Administration through the pulmonary route may be achieved using a nebulizer, metered-dose inhaler or drypower inhaler.

In one example, the treatment is by administering an injection. The injection is, for example, an intra-muscular (IM) injection. In one example, the injection is a subcutaneous (SC) injection. The SC injection is, for example, a slow SC injection.

Thus, the present disclosure contemplates the methods, the compositions or the uses as described above, wherein the treatment is by administering an IM injection or SC injection. In one example, the treatment is by administering a SC injection. In one example, the SC injection is a slow subcutaneous injection.

In one example, the treatment is by administering through a respiratory route. In one example, the respiratory route is an intra-nasal route. In one example, the respiratory route is an intra-tracheal route. In one example, the respiratory route is an endo-tracheal route. In one example, the respiratory route is a pulmonary route.

Pulmonary fibrosis is a lung disease that occurs when lung tissue becomes damaged and scarred. This thickened, stiff tissue makes it more difficult for the lungs to fully function.

Pulmonary fibrosis may develop in subjects suffering from ARDS.

Administering PPS or the acceptable salt thereof, for example, by the respiratory route, functions to prevent either the development or advancement of pulmonary fibrosis.

Thus, the present disclosure contemplates the methods, the compositions or the uses as described above, wherein the treatment is by administering through a respiratory route selected from the group consisting of: an intra-nasal route; endo-tracheal route and pulmonary route.

One prophylactic treatment may be provided intranasally. In this example, the PPS or the acceptable salt thereof may be formulated in a composition such that the PPS or the acceptable salt thereof adheres to the nasal mucous membranes. Any virus entering the nasal passages would be trapped by the adhered composition and in activated.

In one example, the treatment is by administering PPS or the acceptable salt thereof to the subject in an effective amount of about 1 to about 2 mg/kg of the subject per dose. The treatment is, for example, by administering the PPS or the acceptable salt thereof to the mammal in an effective amount of about 2 mg/kg of the subject per dose. In one example, the effective amount is about 1.0 to about 2.0 mg/kg of the subject per dose. In certain examples, the effective amount is about 1.0 to about 1.5 mg/kg; about 1.5 to about 2.0 mg/kg of the subject per dose. In certain examples, the effective amount is about 0.5 mg/kg; about 1.0 mg/kg; about 1.5 mg/kg; or about 2.0 mg/kg of the subject per dose.

In one example, the treatment is by administering the PPS or the acceptable salt thereof to the subject in an effective amount of about 1 to about 2 mg/kg of the subject per dose or an effective amount of between about 1 mg and 4000 mg as a fixed dose.

In one example, the treatment is by administering the PPS or the acceptable salt thereof to the subject in an effective amount in the range of about 1 mg to about 25 mg as a fixed dose. In certain examples, the effective amount is a fixed dose in the range between: about 2 mg and about 24 mg; about 3 mg and about 23 mg; about 4 mg and about 22 mg; about 5 mg and about 21 mg; about 6 mg and about 20 mg; about 7 mg and about 19 mg; about 8 mg and about 18 mg; about 9 mg and about 17 mg; about 10 mg and about 16 mg; about 11 mg and about 15 mg; about 12 mg and about 14 mg. In certain examples, the effective amount is a fixed dose of about 1 mg, about 2 mg, about 3 mg, about 4 mg, about 5 mg, about 6 mg, about 7 mg, about 8 mg, about 9 mg, about 10 mg, about 11 mg, about 12 mg, about 13 mg, about 14 mg, about 15 mg, about 16 mg, about 17 mg, about 18 mg, about 19 mg, about 20 mg, about 21 mg, about 22 mg, about 23 mg, about 24 mg or about 25 mg.

In one example, the effective amount is a fixed dose of between about 25 mg and about 4000 mg. In certain examples, the effective amount is a fixed dose of about 25 mg, about 50 mg, about 75 mg, about 100 mg, about 125 mg, about 150 mg, about 175 mg, about 200 mg, about 225 mg, about 250 mg, about 275 mg, or about 300 mg. In certain examples, the effective amount is a fixed dose of about 350 mg, about 400 mg, about 450 mg, about 500 mg, about 550 mg, about 600 mg, about 650 mg, about 700 mg, about 750 mg, about 800 mg, about 850 mg, about 900 mg, about 950 mg, about 1000 mg, about 2000 mg, about 3000 mg, or about 4000 mg.

In one example, the effective amount is a fixed dose of between about 25 mg and about 300 mg. In certain examples, the effective amount is a fixed dose of about 25 mg, 50 mg, 75 mg, 100 mg, 125 mg, 150 mg, 175 mg, 200 mg, 225 mg, 250 mg, 275 mg, or 300 mg.

In one example, the treatment is by administering the polysulfated polysaccharide or the acceptable salt thereof to the subject in an effective amount of about 2 mg/kg of the subject per dose or an effective amount of about 150 mg as a fixed dose.

In one example, administration to a human is by dosing in a treatment regimen once daily, twice weekly or thrice weekly. The administration to a human is, for example, by dosing in a treatment regimen twice weekly. In one example, the administration to a human is by dosing in a treatment regimen twice weekly with a minimum of three days and a maximum of four days between dosages. The administration to a human is, for example, by dosing in a treatment regimen twice weekly for six weeks. In one example, the total dose of polysulfated polysaccharide administered in the human treatment regimen is about 200 to about 4000 mg. It would be appreciated that animal equivalent doses of the doses specified for use in humans herein may be administered to non-human animal subjects.

It would be recognised that the dosage is adjusted accordingly for heavier or lighter weighted individuals. The treatment regimen may be adapted according to the severity of the infection experienced by the subject. In some instances where a patient is experiencing a severe infection, it is desirable to reach a therapeutic loading of the PPS as quickly as possible. This may necessitate, for example, the administration of about 1.0 mg/kg or more PPS daily until the infection is resolved.

When administration is by, for example, injection or a respiratory route or a route that requires supervision, this would normally be carried out in a clinical situation by a nurse/doctor. The person skilled in the art would understand that the key to successful treatment is to administer sufficient PPS to the subject to achieve an optimum therapeutic dose in the vicinity of the tissue lesion. Since it is known that PPS accumulates in connective tissues, loading can be achieved over time, eg daily doses of 1 mg PPS/kg over 4-5 days.

From a safety point of view a lower dose range (1-2 mg PPS/kg or a fixed dose of about 25-50 mg) over a longer period and with decreased frequency of administration is preferred. This is because PPS is a known anticoagulant and the basal APT may be elevated with the higher dose (>3 mg PPS/kg or a fixed dose of about 150-200 mg) which could potentially encourage bleeding of any open wounds.

The present disclosure contemplates the use of follow-up (maintenance dosing). For example, whilst IM or SC injection of PPS may constitute an initial treatment, oral or topical formulations of PPS may be used as follow-up (maintenance dose) for the initial IM or SC PPS treatments. Respiratory administration may also be used as an initial or follow-up treatment. The respiratory route may be an intranasal route, an intra-tracheal route, an endotracheal route or a pulmonary route. As another example, this follow-up (maintenance dosing) would also be applicable to initial oral dosing. For administration by IV infusion, doses of 0.5-4 mg PPS/kg daily may be used. Doses for administration by the respiratory may be determined by the person skilled in the art with reference to literature guidance (for example Dong et al. 2020 [26] provide dosage for vapour inhalation of IFN-alpha in the treatment of ARDS).

The present disclosure also contemplates co-administration of polysulfated polysaccharides, for example PPS, with additional treatment options for ARDS. In one example, the treatment option comprises support treatment. The support treatment may be ventilation with oxygen either alone or in supplemented with other agents, such as broad spectrum antivirals, antibiotics, corticosteroids, convalescent plasma [6]. The additional treatment option comprises administration of agents suitable for the treatment of ARDS. Agents suitable for the treatment of ARDS, such as antivirals, are reviewed in Yang et al. 2020 [6], Dong et al. 2020 [26] and Liu et al. 2020 [27], which discusses hydroxychloroquine. As referred to in Dong et al. 2020 (References 2 and 3), the National Health Commission of the People's Republic of China publishes Guidelines for the prevention, diagnosis, and treatment of Novel Coronavirus-induced Pneumonia.

Thus, the present disclosure relates to any one of the methods, compositions or uses described above, wherein the PPS is co-administered with an additional treatment option for ARDS.

When other therapeutic agents are employed in combination with the compounds of the present invention they may be used for example in amounts as noted in the Physician Desk Reference (PDR) or otherwise. For example, Dong et al. 2020 provide the dosage, and mode of administration and duration of treatment for recommended antivirals: IFN-alpha, lopinavir/ritonavir, ribavirin, chloroquine phosphate, arbidol [26].

It will be understood, that the specific dose level and frequency of dosage for any particular patient may be varied and will depend upon a variety of factors including the activity of the specific compound employed, the metabolic stability and length of action of that compound, the age, body weight, general health, sex, diet, mode and time of administration, rate of excretion, drug combination, the severity of the particular condition, and the host undergoing therapy. It would be recognised that there is a varied host susceptibility to coronavirus infection, such as SARS-CoV-2 infection. While some patients are asymptomatic or display only mild symptoms or serious illness has been observed to develop in groups which either have underlying medical conditions or a predisposition to underlying medical conditions, like high blood pressure, chronic heart and lung disease or where the immune system is compromised such as in the elderly or patients with immune disorders such as diabetes. It would be understood that large animals require larger doses. For illustration, a large animal like a horse may require a fixed dose of about 4000 mg.

The determination of the suitability of the treatment of the present disclosure or in other words the diagnosis of ARDS may be established through the use of a number of parameters and protocols which have been used to assess patients suffering from ARDS, such as ARDS caused by SARS-CoV-2 [5, 7].

EXAMPLES

Experimental

Evaluation of PPS for use in treatment in ARDS caused by SARS-CoV-2 can be undertaken following published protocols. Standard assays exist to measure the effects of potential pharmaceutical candidates on the cytotoxicity, virus yield and infection rates of SARS-CoV-2 [1]. Experiments are described for investigating the potency of compounds against a panel of coronaviruses [1, 28]. Animal model work can be performed. In this regard, experiments in a mice model for infection of epithelial lung cells in humans have been described [1, 28]. The safety, tolerability and results of patients treated with PPS may be evaluated under compassionate use. For example, resdemvir has been administered to a patient with SARS-CoV-2 infection leading to pneumonia and ARDS [5]. In this regard, approval to use PPS in the clinical setting has been acquired in the past under the Special Access Scheme (SAS) of the Australian Government Therapeutic Goods Administration.

The desired therapeutic effects (e.g. anti-inflammatory and fibrinolytic) of PPS may be achieved at doses as low as 2 mg/kg twice weekly subcutaneously. This dosing scheme is currently used in Phase 1 and 2 studies of PPS in knee osteoarthritis and bone marrow edema and has no lasting effect on blood coagulation. Based on the evidence of the multifaceted actions of PPS, it is proposed that PPS has potential as a monotherapy or as an adjunctive treatment option for ARDS, caused by SARS-CoV-2.

In study 1, the effects of PPS (NaPPS) on influenza virus-induced acute respiratory distress syndrome (ARDS) was evaluated. Set out in the following are the details of the study and results achieved.

The main features of experimentally induced ARDS in animals include (1) histological evidence of injury to pulmonary cell populations and tissues, (2) altered integrity of the alveolar capillary barrier, (3) the presence of an inflammatory response as indicated by infiltrating leukocytes, and (4) physiological changes consistent with pulmonary dysfunction (Matute-Bello et al. 2011). The C57BL/6J mouse model of Influenza A virus (IAV) infection is well accepted as a model of viral lung pathogenesis and has been used extensively to decipher mechanisms of immune response in the lung that led to severe respiratory disease, including antiviral studies, immunotherapy, and vaccination studies (Infusini et al., 2015; Pizzolla et al., 2017, 2018; Wakim et al., 2013, 2015). In order to determine, the effects of PPS in ARDS the C57BL/6J mouse model of Influenza A virus was used as an exploratory model.

The specific hypothesis to be tested was that:

PPS demonstrates reduction of lung inflammation at the onset of viral induced lung infection via the subcutaneous route of administration; and The effects of PPS are attributed to its anti-inflammatory effects via inhibition of the transcription factor NF-κB and other inflammatory processes involving deposition of fibrin, complement mediated lung injury; cytokine response; inflammation and neutrophil infiltration.

The aim of these experiments was to evaluate the role of PPS in alleviating inflammatory disease following influenza infection in mice.

Study objectives: To assess the safety of PPS as measured by clinical picture—maintenance of body weight, clinical and anatomical pathology assessments of treated animals compared to the control group; and To evaluate the biological response of mice infected with Influenza virus to treatment with PPS.

In this set of experiments (A & B) animals were divided into the following groups (and associated sample size):

Experiment A: PPS Administered at Day 0.

Experiment A consisted of one end point, day 8, where mice were euthanized, and tissues were collected for histological processing and analysis.

Treatment Groups:
1. Uninfected PBS vehicle control (n=5)
2. Uninfected drug treated (n=6/drug route)
3. Infected vehicle treated (n=10/drug route)
4. Infected drug treated (n=10/drug route)

Drug Administration Routes:
1. Intraperitoneally (i.p.)
2. Subcutaneously (s.c.)

Tissue Harvest Time Points:
1. Day 8 post-infection

Experiment B: PPS Administered at Either Day 0 or 2 Post-Infection. Experiment B consisted of one time point (Day 8) for the collection of tissues to determine viral titres, weight loss, lung histopathology and oxygen saturation, and one time point to determine lung fibrosis at Day 21.

Treatment Groups & Respective Number of Mice Per Group:
Uninfected PBS vehicle control (n=4)
Uninfected drug treated—(n=7)
Infected vehicle treated—(n=7)
Infected drug treated—(n=7)

Drug Administration Routes:
Subcutaneous only

Tissue Harvest Time Points:
Day 8 post-infection—7 mice/group for analysis of acute disease
Day 21 post-infection—7 mice/group for analysis of fibrosis Materials and Methods Animal Species 8-10-week-old female C57BL/6J mice were intranasally inoculated with the optimal pathogenic, sublethal dose (150-300 plaque forming units (PFU)) of H1N1 PR-8 influenza strain at day 0 for all experiments.

Drug Preparation and Administration.

All test, reference, and vehicle items not "supplied for use" were prepared fresh prior to use on the day of injection. PPS was prepared fresh daily under aseptic conditions in endotoxin free phosphate buffered saline (PBS). 3 mg/kg (fixed dose based on initial body weight at day 0) in a volume of 200 µl PBS was administered to the mice either via the intraperitoneal (i.p.) or subcutaneous (s.c.) route of administration daily for 8 days. Vehicle control animals were administered 200 µl i.p. or s.c. PBS daily.

Clinical Disease Monitoring

In all experiments, mice were weighed daily using electronic scales to determine disease progression. In experiment B, pulse oximetry was performed under light anaesthesia on days 6 and 8 post-infection to measure oxygen saturation (SpO2).

Histological Analyses

At termination, lung tissue was harvested, fixed in 10% neutral buffered formalin, and embedded in paraffin wax. Three consecutive sections of 4-micron thick tissue sections were sectioned per mouse and stained with hematoxylin and eosin (H&E). QuPath software was used to generate nuclei counts per mm2 in each imaged tissue section. A classification algorithm was applied to detect the outline of each tissue section, and the script was run to apply the terms to all subsequent slides. Masson's trichrome staining, used to detect collagen fibrosis was conducted on lung tissue sections.

Results:

PPS prevents weight loss in influenza-mediated ARDS animals.

Animals were infected with PR8 influenza strain intranasally at Day 0 and then treatment was administered either via the ip or sc (n=10/group) route. In Experiment A, PPS at a dose of 3 mg/kg (n=6/group/route of administration) or vehicle consisting of Phosphate Buffered Saline (n=5/group) was administered within 4 hours of intranasal installation of the virus (Day 0 post-infection). Treatment was administered daily from Day 0 to Day 7.

In Experiment B (n=7/group) after infection, treatment was administered at either Day 0 or at Day 2 post-infection. Animal weights were measured daily throughout the course of the study. Infected animals treated with vehicle showed weight loss from Days 4 up to Day 8 post-infection. Animals that were treated with PPS at a dose of 3 mg/kg by either ip or sc demonstrated reduced weight loss compared to infected animals treated with vehicle.

Mock infected (uninfected) animals (n=5) did not demonstrate weight loss during the course of the 8-day study period.

PPS reduces the numbers of inflammatory cell infiltrates in the lungs of influenza-mediated ARDS animals.

Animals were infected with PR8 strain of H1N1 intranasally at Day 0 and then treatment was administered either via the ip or sc route. PPS at a dose of 3 mg/kg or vehicle was administered within 4 hours of intranasal installation of the virus (Day 0 post-infection) and treatment continued daily till Day 7. At the termination of the experiment at Day 8, animal lungs were excised and fixed with formalin and sections stained with Haematoxylin and Eosin. QPath software was used for nuclei counts (per $mm^2$). A classification algorithm was applied to detect the outline of each tissue section, and the script was run to apply the terms to all subsequent slides.

Panel A: Data are represented as Box plots showing numbers of nuclei/$mm^2$. The data demonstrate a statistically significant reduction in the number of nuclei/$mm^2$ in PPS treated animals compared to vehicle treated animals for both the ip () and sc (*) routes of administration. The level of nuclei/$mm^2$ in infected animals treated with PPS were comparable to uninfected animals (vehicle or PPS treated)

implying that PPS had normalised the levels of cellular infiltration into the lungs of infected animals. Three non-consecutive sections per animal lung tissue were used.

Panel B: Demonstrates representative sections at low and high magnifications of lungs from animals at Day 8. PPS treatment at a dose of 3 mg/kg administered either by the ip or sc route showed reduced cellular infiltration compared to the vehicle treated animals.

PPS improves lung function determined by oxygen saturation in influenza-mediated ARDS animals.

Animals were infected with PR-8 strain of H1N1 intranasally at Day 0 and then treatment was administered via the sc route. PPS at a dose of 3 mg/kg or vehicle was administered within 4 hours of intranasal installation of the virus at either Day 0 or at Day 2 post-infection. Oxygen saturation levels were measured using the MouseOx Plus Oximeter (STARR Life Sciences). Animals were lightly anaesthetised and oxygen saturation was measured non-invasively at Day 6 and Day 8 post-infection. Panels A and B are Box plots that represent oxygen saturation levels. The data indicate that PPS treatment had improved oxygen saturation levels compared to the vehicle treated infected animals.

PPS treatment reduces progression of pulmonary fibrosis in influenza-mediated ARDS animals.

Animals were infected with PR-8 strain of H1N1 intranasally at Day 0 and then treatment was administered via the sc route.

In Panel A, PPS at a dose of 3 mg/kg or vehicle was administered within 4 hours of intranasal installation of the virus (Day 0 post-infection). In Panel B, after infection treatment was initiated at Day 2 post-infection. At the termination of the experiment at Day 21, animal lungs were excised and fixed with formalin and sections stained with Masson's Trichrome stain (three representative sections for each treatment group are displayed). Collagen, the major component of the fibrotic response was stained blue as shown in the panels above. The data demonstrated that the fibrotic response was reduced whether PPS was administered either on Day 0 or Day 2 post-infection compared to the vehicle treatment group.

In the murine model of influenza-mediated ARDS the pathophysiological changes were demonstrated by weight loss and impaired lung function by reduction in oxygen saturation. Histopathology findings in the lung were associated with increased cellular infiltration and progressive pulmonary fibrosis. These pathogenic mechanisms are driven by the cytokine storm that ensues at the onset of viral infection.

The daily animal dose of 3 mg/kg of PPS (human equivalent dose of 0.24 mg/kg) demonstrated improvement in clinical symptoms and reduced histopathology findings of lung infiltration and fibrosis. Therefore, this study provides evidence that the effects mediated by PPS in reducing ARDS in this animal model are facilitated by its anti-inflammatory effects potentially via inhibition of the transcription factor NF-κB and other inflammatory processes involving deposition of fibrin; complement-mediated lung injury; cytokine response; inflammation and immune cell infiltration.

This study shows that the PPS effects in the influenza-mediated ARDS model involved the demonstration of:
Reduced weight loss and improved lung function.
Reduced inflammatory cellular infiltration in lungs.
Reduced progression of pulmonary fibrosis.

Study 1 References

1 Matute-Bello, G., Downey, G., Moore, B. B., Groshong, S. D., Matthay, M. A., Slutsky, A. S., Kuebler, W. M. (2011). An official American thoracic society workshop report: Features and measurements of experimental acute lung injury in animals. Am J Respir Cell Mol Biol 44, 725-38.

2 Infusini, G., Smith, J. M., Yuan, H., Pizzolla, A., Ng, W. C., Londrigan, S. L., Hague, A., Reading, P. C., Villadangos, J. A., and Wakim, L. M. (2015). Respiratory DC Use IFITM3 to Avoid Direct Viral Infection and Safeguard Virus-Specific CD8+ T Cell Priming. PLoS ONE 10, e0143539.

3 Inglis, J. K. (1980). UNIT 2—Animal Care Routines. In Introduction to Laboratory Animal Science and Technology, J. K. Inglis, ed. (Pergamon), pp. 38-66.

4 Pizzolla, A., Wang, Z., Groom, J. R., Kedzierska, K., Brooks, A. G., Reading, P. C., and Wakim, L. M. (2017). Nasal-associated lymphoid tissues (NALTs) support the recall but not priming of influenza virus-specific cytotoxic T cells. Proceedings of the National Academy of Sciences 114, 5225-5230.

5 Pizzolla, A., Nguyen, T. H., Sant, S., Jaffar, J., Loudovaris, T., Mannering, S. I., Thomas, P. G., Westall, G. P., Kedzierska, K., and Wakim, L. M. (2018). Influenza-specific lung-resident memory T cells are proliferative and polyfunctional and maintain diverse TCR profiles. Journal of Clinical Investigation.

6 Wakim, L. M., Gupta, N., Mintern, J. D., and Villadangos, J. A. (2013). Enhanced survival of lung tissue-resident memory CD8+ T cells during infection with influenza virus due to selective expression of IFITM3. Nature Immunology 14, 238-245.

7 Wakim, L. M., Smith, J., Caminschi, I., Lahoud, M. H., and Villadangos, J. A. (2015). Antibody-targeted vaccination to lung dendritic cells generates tissue-resident memory CD8 T cells that are highly protective against influenza virus infection. Mucosal Immunology.

In study 2, the potential in vitro antiviral activity of PPS (NaPPS) was evaluated.

Materials: PPS; cell culture media, fetal bovine serum (FBS) and disposable plastic ware; methylcellulose, crystal violet, methanol; and angiotensin converting enzyme 2 (ACE2)-expressing Cell Line-Vero (Africa Green Monkey kidney epithelium). Virus-SARS-CoV-2 (GISAID accession ID: EPI_ISL_413489).

Methods

Incubation of Cells with PPS Prior to Infection.

Vero cells were plated at $2.5 \times 10^5$ cell/well in 24-well plates in EMFM supplemented with 10% fetal bovine serum (complete medium). Twenty-four h later, cells were incubated with serial dilutions of PPS in 300 µl of complete medium 30 min prior to infection with a virus solution containing 50 plaque forming units (PFU) of SARS-CoV-2 strain. After incubation for 1 h at 37° C., supernatants were discarded, 500 of 1% methylcellulose overlay dissolved in medium containing 1% of fetal bovine serum was added to each well. After 3 days, cells were fixed and stained as described above using a 6% (v/v) formaldehyde:phosphate-buffered saline solution and stained with 1% (w/v) crystal violet (Sigma-Aldrich, Italy) in 70% (v/v) methanol (Sigma-Aldrich, Italy). The plaques will be counted under a stereoscopic microscope (SMZ-1500, Nikon).

Incubation of Virus-Containing Supernatant with PPS

Cells were plated as described above. 50 plaque forming units (PFU) of SARS-CoV-2 were incubated with compound serial dilutions of for 30 min at 37° C. and then added to Vero cells. After incubation for 1 h at 37° C., supernatants were discarded, 500 µl of 1% methylcellulose overlay dissolved in medium containing 1% of fetal bovine serum will be added to each well. After 3 days, cells will be fixed and stained as described above.

Data Analysis.

Three independent experiments, two experiments in triplicates and one experiment in duplicates per each condition, was conducted. The experimental results were analyzed by appropriate statistical methods by GraphPad PRISM version 8.2.1.

Results

Incubation of Cells with PPS Prior to Infection.

Figure 7:
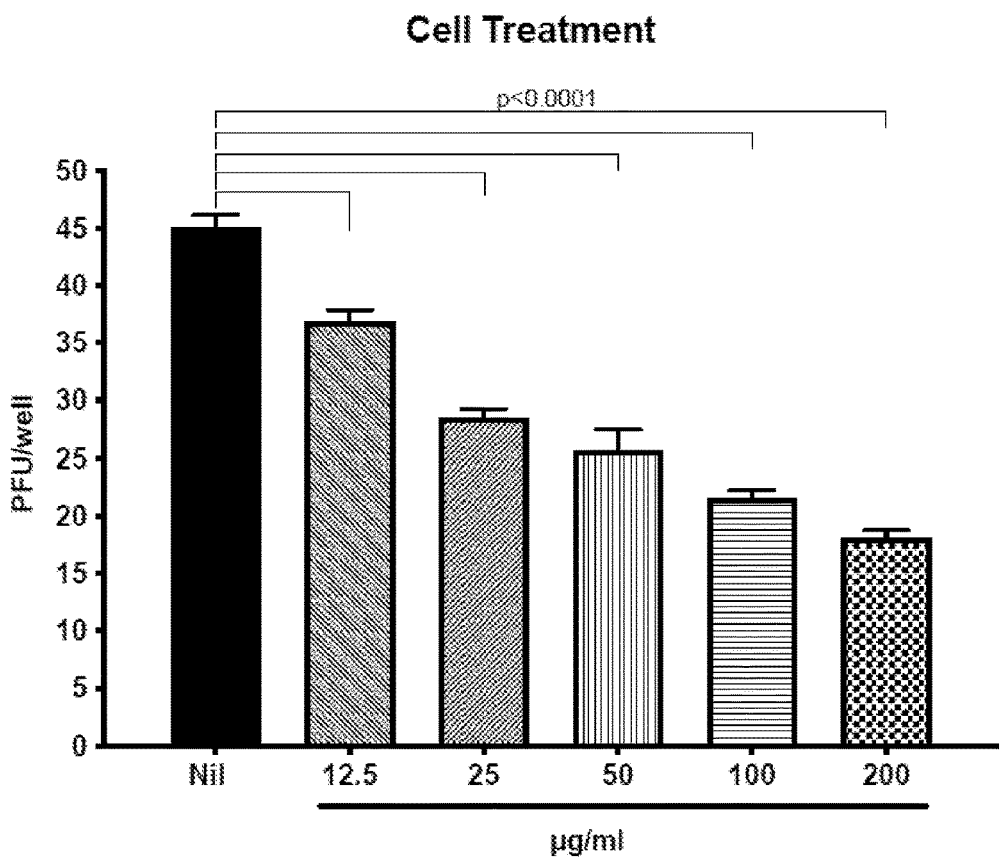
FIG. 7 are graphs showing the results achieved in the incubation of cells with PPS prior to infection.
Figure 7:
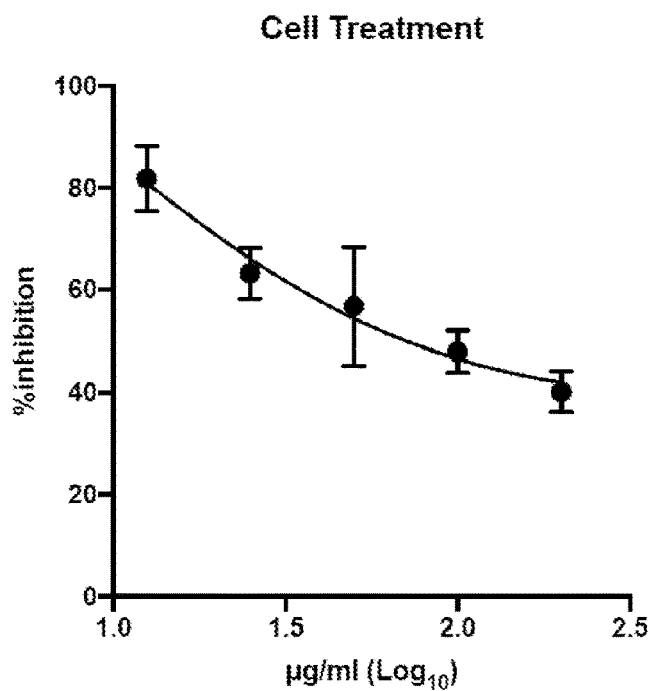

A dose response of PPS from 12.5 µg/ml to 200 µg/ml was tested. PPS serial dilutions were added to Vero cells for 30 min prior to infection with 50 PFU/well. Maximum statistically significant PPS inhibition of plaque formation reached 60% at the top dose of 200 µg/ml (Table 1 and FIG. 7). In FIG. 7, bars represent the mean±SEM. Statistical analysis was carried out with one-way Anova test with Bonferroni correction.

TABLE 1

| PPS Dose (µg/ml) | PFU/well | | | | | | | |
|---|---|---|---|---|---|---|---|---|
| Nil | 41 | 42 | 48 | 43 | 49 | 46 | 45 | 47 |
| 12.5 | 35 | 33 | 34 | 40 | 41 | 39 | 36 | 37 |
| 25 | 29 | 31 | 27 | 25 | 27 | 28 | 29 | 32 |
| 50 | 17 | 20 | 32 | 25 | 31 | 29 | 27 | 24 |
| 100 | 20 | 19 | 22 | 23 | 21 | 22 | 25 | 21 |
| 200 | 18 | 16 | 20 | 21 | 17 | 19 | 16 | 18 |

Data are from 3 independent experiments.

Incubation of Virus with PPS Prior to Infection.

Figure 8:
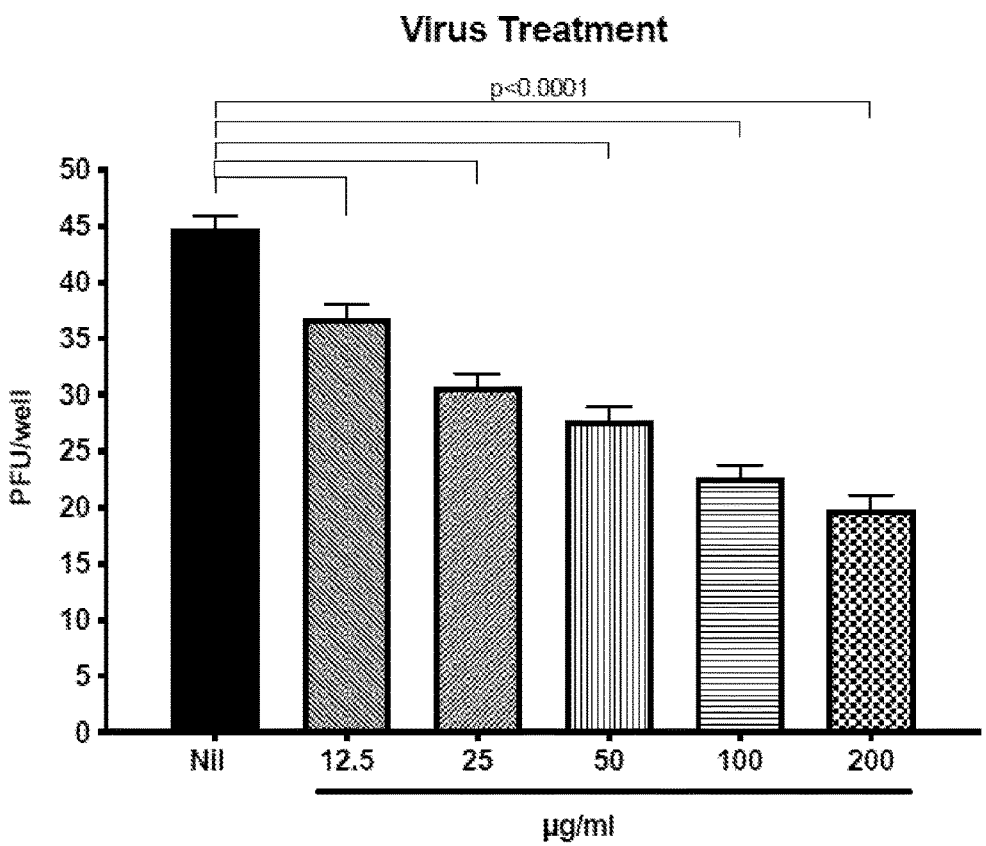
FIG. 8 are graphs showing the results achieved in the incubation of virus with PPS prior to infection.
Figure 8:
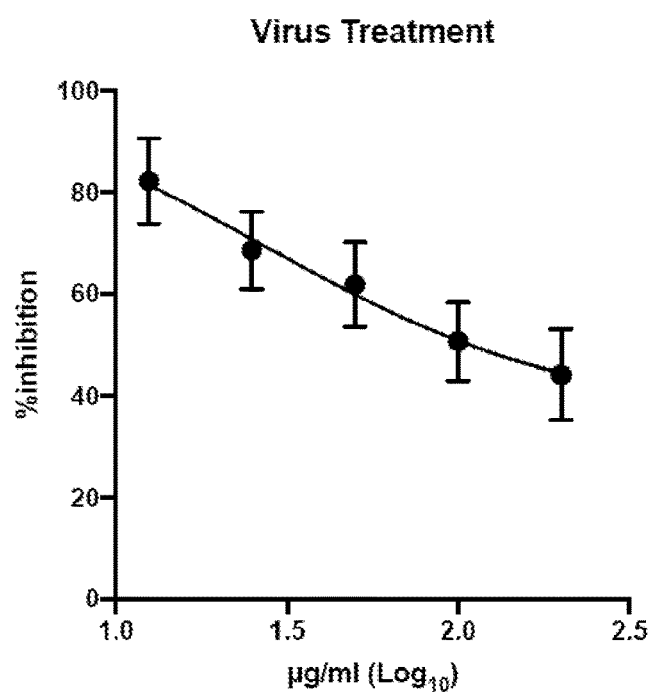

A dose response of PPS from 12.5 µg/ml to 200 µg/ml was incubated with SARS-CoV-2 inoculum containing 50 plaques for 30 min prior to addition to Vero cells. Maximum statistically significant PPS inhibition of plaque formation reached 56% at the top dose of 200 µg/ml (Table 2 and FIG. 8). In FIG. 8, bars represent the mean±SEM. Statistical analysis was carried out with one-way Anova test with Bonferroni correction.

TABLE 2

| PPS Dose (µg/ml) | PFU/well | | | | | | | |
|---|---|---|---|---|---|---|---|---|
| Nil | 43 | 45 | 48 | 41 | 40 | 49 | 45 | 47 |
| 12.5 | 31 | 33 | 39 | 34 | 42 | 38 | 40 | 37 |
| 25 | 25 | 28 | 31 | 28 | 34 | 33 | 35 | 31 |
| 50 | 24 | 21 | 28 | 31 | 32 | 30 | 29 | 26 |
| 100 | 19 | 17 | 23 | 26 | 22 | 25 | 22 | 27 |
| 200 | 16 | 12 | 20 | 22 | 21 | 23 | 24 | 20 |

Data are from 3 independent experiment

Incubation of Virus and Cells with PPS Prior to Infection.

Figure 9:
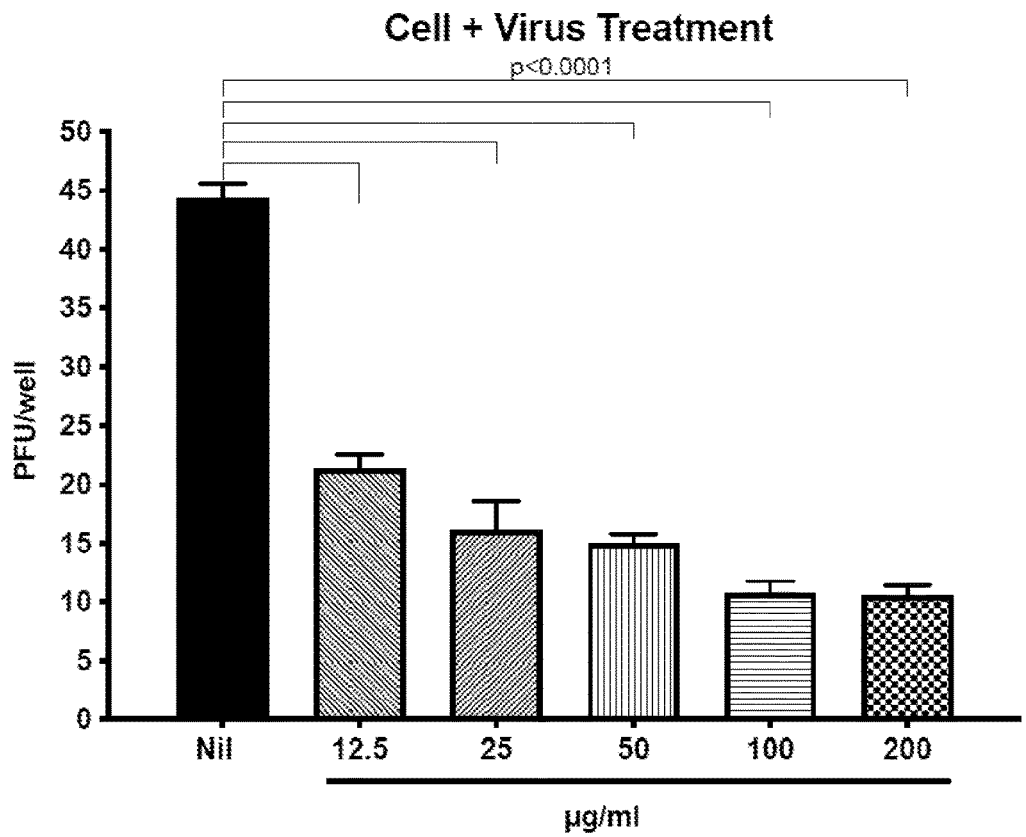
FIG. 9 are graphs showing the results achieved in the incubation of virus and cells with PPS prior to infection.
Figure 9:
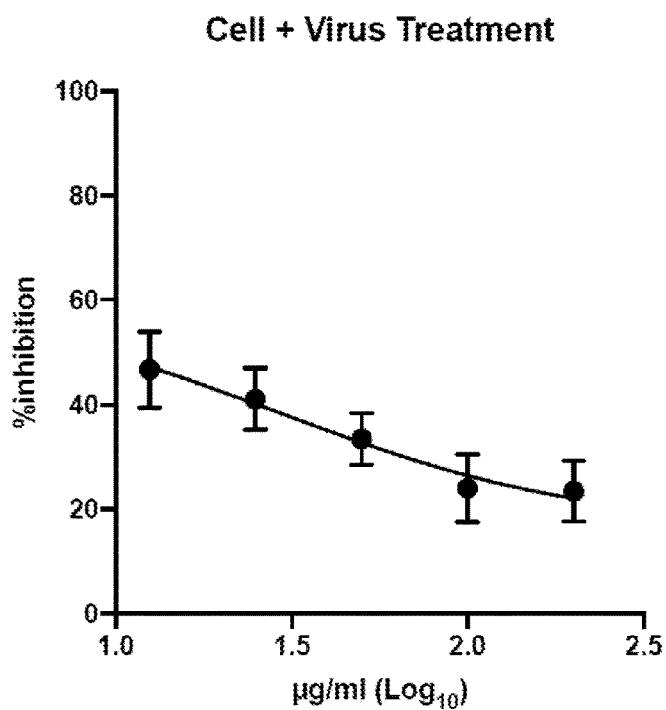

A dose response of PPS from 12.5 µg/ml to 200 µg/ml was incubated with SARS-CoV-2 inoculum containing 50 plaques for 30 min prior to addition to Vero cells that, in addition, were incubated with the same dose response for 30 min prior to infection. Maximum, statistically significant, PPS inhibition of plaque formation reached 77% at the top dose of 200 µg/ml (Table 3 and FIG. 9). In FIG. 9, bars represent the mean±SEM. Statistical analysis was carried out with one-way Anova test with Bonferroni correction.

TABLE 3

| PPS Dose (µg/ml) | PFU/well | | | | | | | |
|---|---|---|---|---|---|---|---|---|
| Nil | 45 | 40 | 39 | 44 | 44 | 49 | 48 | 46 |
| 12.5 | 18 | 19 | 17 | 22 | 20 | 25 | 26 | 20 |
| 25 | 18 | 15 | 15 | 20 | 21 | 19 | 22 | 17 |
| 50 | 12 | 14 | 15 | 13 | 14 | 18 | 16 | 18 |
| 100 | 8 | 12 | 11 | 7 | 13 | 10 | 16 | 9 |
| 200 | 6 | 12 | 10 | 8 | 11 | 14 | 10 | 13 |

Data are from 3 independent experiments.

These results show that PPS inhibits SARS-CoV-2 infection of Vero cells in a dose-dependent manner. Either cell or virus treatment for 30 min prior to infection results in an inhibition of virus infection of 60% and 56%, respectively. However, the combined treatment of the inoculum and the cells has an additive effect as the percentage inhibition of infection reached 77%.

Study 2 References:

Terpos E, Ntanasis-Stathopoulos I, Elalamy I, et al. Hematological findings and complications of COVID-19. Am J Hernatol 2020; 95(7): 834-47.

Lin L, Yu Y, Zhang F, Xia K, Zhang X, Linhardt R J. Bottom-up and top-down profiling of pentosan polysulfate. Analyst 2019; 144(16): 4781-6.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

REFERENCES

1. Sheahan T P, Sims A C, Graham R L, Menachery V D, Gralinski L E, Case J B, Leist S R, Pyrc K, Feng J Y, Trantcheva I, Bannister R, Park Y, Babusis D, Clarke M O, Mackman R L, Spahn J E, Palmiotti C A, Siegel D, Ray A S, Cihlar T, Jordan R, Denison M R, Baric R S. Broad-spectrum antiviral GS-5734 inhibits both epidemic and zoonotic coronaviruses. Sci Transl Med. 2017 Jun. 28;9(396):eaal3653.
2. Chen N, Zhou M, Dong X, Qu J, Gong F, Han Y, Qiu Y, Wang J, Liu Y, Wei Y, Xia J, Yu T, Zhang X, Zhang L. Epidemiological and clinical characteristics of 99 cases of 2019 novel coronavirus pneumonia in Wuhan, China: a descriptive study. The Lancet. 2020:395(10223):507-513.
3. Guo Y R, Cao Q D, Hong Z S, Tan Y Y, Chen S D, Jin H J, Tan K S, Wang D Y, Yan Y. The origin, transmission and clinical therapies on coronavirus disease 2019 (COVID-19) outbreak—an update on the status. Mil Med Res. 2020 Mar. 13;7(1):11.
4. Coronavirus disease 2019 (COVID-19) Situation Report—75 [Internet]. Who.int. 2020 [cited 2020 Apr. 4]. Available from: https://www.who.int/docs/default-source/coronaviruse/situation-reports/20200404-sitrep-75-covid-19.pdf?sfvrsn=99251b2b 2
5. Holshue M L, DeBolt C, Lindquist S, Lofy K H, Wiesman J, Bruce H, Spitters C, Ericson K, Wilkerson S, Tural A, Diaz G, Cohn A, Fox L, Patel A, Gerber S I, Kim L, Tong S, Lu X, Lindstrom S, Pallansch M A, Weldon W C, Biggs H M, Uyeki T M, Pillai S K; Washington State 2019-nCoV Case Investigation Team. First Case of 2019 Novel Coronavirus in the United States. N Engl J Med. 2020 Mar. 5;382(10):929-936.

6. Yang Yang, Md Sahidul Islam, Jin Wang, Yuan Li and Xin Chen Traditional Chinese Medicine in the Treatment of Patients Infected with 2019-New Coronavirus (SARS-CoV-2): A Review and Perspective *Int. J. Biol. Sci.* 2020, Vol. 16, pages 1708-1717
7. Moore H, Barrett C, Moore E, McIntyre R, Moore P, Talmor D, Moore F, Yaffe M. Is There a Role for Tissue Plasminogen Activator (tPA) as a Novel Treatment for Refractory COVID-19 Associated Acute Respiratory Distress Syndrome (ARDS)?. Journal of Trauma and Acute Care Surgery. 2020;1.
8. Zumla A, Chan J F, Azhar E I, Hui D S, Yuen K Y. Coronaviruses—drug discovery and therapeutic options. Nat Rev Drug Discov. 2016 May; 15(5):327-47.
9. Scully M F, Weerasinghe K M, Ellis V, Djazaeri B, Kakkar V V. Anticoagulant and anti-heparin activities of a pentosan polysulphate. Thrombosis Research 1983; 31(1):87-97.
10. Krupinski K, Breddin H K, Casu B. Anticoagulant and antithrombotic effects of chemically modified heparins and pentosan polysulfate. Haemostasis 1990; 20(2):81-92.
11. Shanmugam M, Mody K H. Heparinoid-active sulphated polysaccharides from marine algae as potential blood anticoagulant agents. Current Science 2000; 79(12):1672-1683.
12. Vongchan P, Sajomsang W, Kasinrerk W, Subyen D, Kongrawelert P. Anticoagulant activities of the chitosan polysulfate synthesized from marine crab shell by semi-heterogeneous conditions. Science Asia 2003; 29:115-120.
13. Vinazzer H. Prevention of recurrence of cerebrovascular thromboses. A randomized comparative study acetylsalicylic acid and sodium pentosan polysulfate. Fortschr Med 1987; 105(5):79-85.
14. Losonczy H, David M, Nagy I. Effect of pentosan polysulfate on activated partial thromboplastin time, thrombin time, euglobulin clot lysis and tissue-type plasminogen activator and plasminogen activator inhibitor activities in patients with thromboembolic disease. Semin Thromb Hemost 1991; 17(4):394-8.
15. WO 2002/41901. Treatment of osteoporosis.
16. WO 2012/103588. Treatment of bone marrow (oedema) with polysulfated polysaccharides.
17. WO 2008/144836. Sulphated xylans for treatment or prophylaxis of respiratory diseases.
18. Gaffney P J, Marsh N A. The effect of pentosan polysulphate (SP54) on the human fibrinolytic system. Folia Haematologica (Leipzig, Germany: 1928). 1986; 113(1-2):262-271.
19. Kilgore K S, Naylor K B, Tanhehco E J, Park J L, Booth E A, Washington R A, Lucchesi B R. The Semisynthetic Polysaccharide Pentosan Polysulfate Prevents Complement-Mediated Myocardial Injury in the Rabbit Perfused Heart. Journal of Pharmacology and Experimental Therapeutics. 1998: 285(3):987-994.
20. Herrero L J, Foo S S, Sheng K C, Chen W, Forwood M R, Bucala R, Mahalingam S. Pentosan Polysulfate: a Novel Glycosaminoglycan-Like Molecule for Effective Treatment of Alphavirus-Induced Cartilage Destruction and Inflammatory Disease. J Virol. 2015 August; 89(15): 8063-76.
21. SUNAGA T, OH N, HOSOYA K, TAKAGI S, OKUMURA M. Inhibitory Effects of Pentosan Polysulfate Sodium on MAP-Kinase Pathway and NF-κB Nuclear Translocation in Canine Chondrocytes In Vitro. Journal of Veterinary Medical Science. 2012;74(6):707-711.
22. Klinger M, Zugmaier G, Nagele V, Goebeler M, Brandl C, Stelljes M, Lassmann H, von Stackelberg A, Bargou R, Kufer P. Adhesion of T Cells to Endothelial Cells Facilitates Blinatumomab-Associated Neurologic Adverse Events. Cancer Research. 2019;80(1):91-101.
22A. Andrews J L, Ghosh P, Lentini A, Ternai B. The interaction of pentosane polysulphate (SP54) with human neutrophil elastase and connective tissue matrix components. Chem Biol Interact. 1983 November; 47(2):157-73. PubMed PMID: 6197196.
22B. Jean-Louis Vincent, Gustavo Buchele, Gustavo A. Ospina-Tascon, Mechanical Ventilation, Clinical Applications and Pathophysiology, 2008, pages 503-508, Chapter 43—Cytokine Modulation Therapy in Acute Respiratory Failure and ARDS
22C. Vistnes M, Aronsen J M, Lunde I G, Sjaastad I, Carlson C R, Christensen G. Pentosan polysulfate decreases myocardial expression of the extracellular matrix enzyme ADAMTS4 and improves cardiac function in vivo in rats subjected to pressure overload by aortic banding. PLoS One. 2014 Mar. 3;9(3):e89621.
22D. Cabrera-Benitez N E, Laffey J G, Parotto M, Spieth P M, Villar J, Zhang H, Slutsky A S. Mechanical ventilation-associated lung fibrosis in acute respiratory distress syndrome: a significant contributor to poor outcome. Anesthesiology 2014 July; 121(1):189-98.
23. For example *Remington: The Science and Practice of Pharmacy,* 21st Edition; Lippincott Williams & Wilkins: Philadelphia, PA, 2005).
24. For example *"Handbook of Pharmaceutical salts"* P. H. Stahl, C. G. Wermuth, $1^{st}$ edition, 2002, Wiley-VCH
25. Fenner's Veterinary Virology (Fifth edition), Editors N. James Maclachlan, Edward J Dubovi, Academic Press, 2016. See Chapter 24 Coronaviridae, which describes the properties of coronaviruses and features of disease they cause in animals
26. Dong L, Hu S, Gao J. Discovering drugs to treat coronavirus disease 2019 (COVID-19). Drug Discoveries & Therapeutics. 2020;14(1):58-60.
27. Liu J, Cao R, Xu M, Wang X, Zhang H, Hu H, Li Y, Hu Z, Zhong W, Wang M. Hydroxychloroquine, a less toxic derivative of chloroquine, is effective in inhibiting SARS-CoV-2 infection in vitro. Cell Discov. 2020 Mar. 18;6:16. doi: 10.1038/s41421-020-0156-0. eCollection 2020.
28. Wang M, Cao R, Zhang L, Yang X, Liu J, Xu M, Shi Z, Hu Z, Zhong W, Xiao G. Remdesivir and chloroquine effectively inhibit the recently emerged novel coronavirus (2019-nCoV) in vitro. Cell Res. 2020 March; 30(3):269-271.

The invention claimed is:

1. A method for the treatment of pulmonary fibrosis in a human subject resulting from the subject suffering Acute Respiratory Distress Syndrome (ARDS) arising from influenza virus infection, the method comprising the step of administering an effective amount of about 1 to about 2 mg/kg of the subject per dose of a pharmaceutically acceptable salt of pentosan polysulfate (PPS) having a molecular weight of 4,000 to 6,000 daltons and a degree of sulfation of 19% to a subject suffering influenza virus infection.

2. The method according to claim 1, wherein the influenza virus is influenza A.

3. The method according to claim 1, wherein the PPS s selected from the group consisting of: the sodium salt of pentosan polysulfate (NaPPS), the magnesium salt of pentosan polysulfate (MgPPS), the calcium salt of pentosan polysulfate (CaPPS) and the zinc salt of pentosan polysulfate (ZnPPS).

4. The method of claim 3, wherein the PPS is NaPPS.

5. The method of claim 4, wherein treatment is by administering intramuscularly (IM), subcutaneously (SC), intravenously (IV), intra-articularly (IA), peri-articularly, topically, via suppositories or orally.

6. The method according to claim 4, wherein treatment is by administering through a respiratory route selected from the group consisting of: an intra-nasal route; intra-tracheal route, endo-tracheal route and a pulmonary route.

7. The method according to claim 5, wherein the treatment is by administering an IM injection or SC injection.

8. The method according to claim 7, wherein the treatment is by administering a SC injection.

9. The method according to claim 8, wherein the SC injection is a slow SC injection.

10. The method according to claim 4, wherein administration is by dosing in a treatment regimen once daily, twice weekly or thrice weekly.

11. The method according to claim 10, wherein administration is by dosing in a treatment regimen twice weekly.

12. The method according to claim 11, wherein administration is by dosing in a treatment regimen twice weekly with a minimum of three days and a maximum of four days between dosages.

13. The method according to claim 12, wherein administration is by dosing in a treatment regimen twice weekly for six weeks.

14. The method according to claim 4, wherein the PPS is co-administered with an additional treatment option for ARDS.

* * * * *